J. KOHLER.
WHEEL TIRE.
APPLICATION FILED FEB. 26, 1912. RENEWED FEB. 16, 1914.
1,115,550.
Patented Nov. 3, 1914.
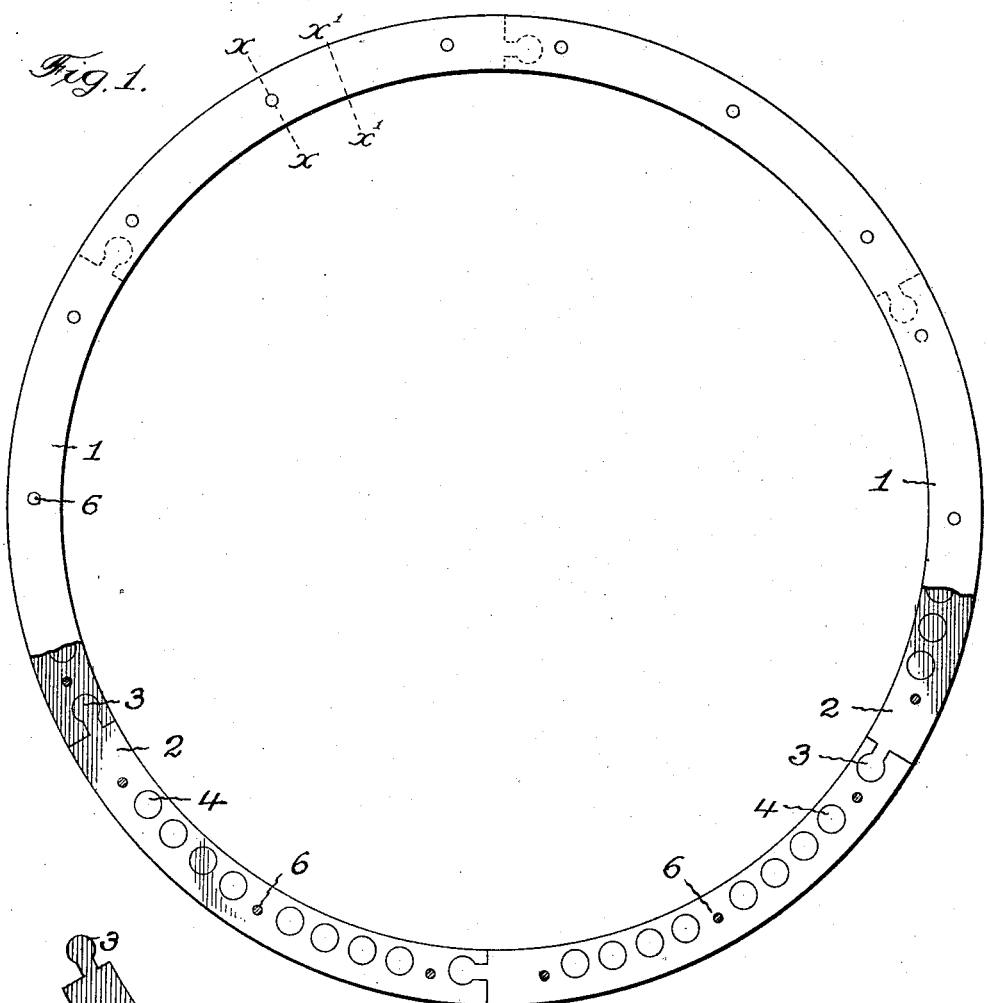
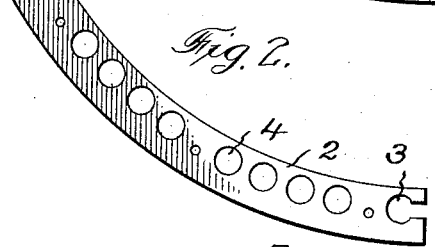
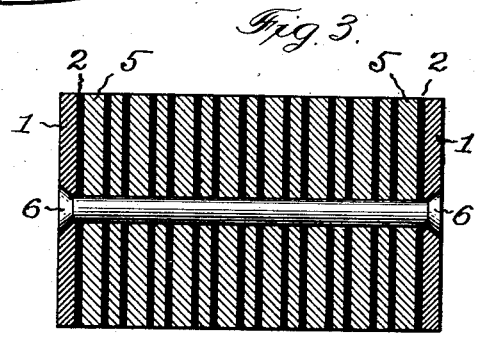
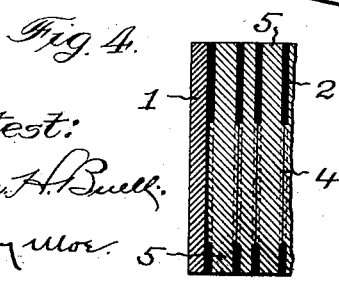
Inventor:
Joseph Kohler.
By Robert Burns
Atty.

UNITED STATES PATENT OFFICE.

JOSEPH KOHLER, OF CHICAGO, ILLINOIS, ASSIGNOR OF ONE-THIRD TO KITTIE COLLINS, OF CHICAGO, ILLINOIS.

WHEEL-TIRE.

1,115,550.      Specification of Letters Patent.      Patented Nov. 3, 1914.

Application filed February 26, 1912, Serial No. 680,052. Renewed February 16, 1914. Serial No. 819,069.

*To all whom it may concern:*

Be it known that I, JOSEPH KOHLER, a citizen of the United States of America, and a resident of Chicago, in the county of Cook, State of Illinois, have invented certain new and useful Improvements in Wheel-Tires, of which the following is a specification.

This invention relates to composite wheel tires, and has for its object to provide a simple and efficient structural formation and arrangement of parts in which traction combined with ability to resist wear are attained in a very effective and economical manner, all as will hereinafter more fully appear.

In the accompanying drawings: Figure 1, is a side view of the tire detached from the wheel, and having portions removed to illustrate the interior construction. Fig. 2, is a detail view of one of the segments of the inner rings of the tire. Figs. 3 and 4, are detail transverse sections on line $x$—$x$, and $x'$—$x'$, respectively, Fig. 1.

Similar reference numerals indicate like parts in the different views.

Referring to the drawings, 1 represents the outer side rings of the tire, preferably formed as single pieces of metal, as shown.

2 are a series of intermediate inner metal rings, which in the present improvement are formed by a plurality of segments attached together at their adjoining ends by tongue and groove connections 3, and formed with a series of perforations or orifices, 4, as shown.

5 are a series of companion rings, corresponding with the rings 2 above described, and also formed by a plurality of segments attached together by tongue and groove connections. The rings 5 in the present invention are formed of a suitable semi-elastic material, preferably vulcanized fiber, and which while affording proper traction is adapted to withstand rapid wear. The series of rings 2 and 5 are assembled alternately together to form the wheel tire, and as so arranged are adapted to provide a tire periphery having alternate circular zones, the one affording a semi-elastic traction surface, and the other a hard and wear resisting surface. In the preferred construction, the series of tongue and groove connections 4, by which the segments of the various inner rings aforesaid, are attached together, are arranged in staggered relation, in order to provide greater strength in the tire as a whole.

6 are a series of transverse bolts or rivets by which the various rings heretofore described are secured together in a firm and substantial manner.

The perforations 4 of the series of intermediate rings 2, are adapted to receive portions of the adjacent semi-elastic rings 5, in the assembly of the parts, to lock the parts together against any tendency to lateral displacement in actual use.

Having thus fully described my said invention, what I claim as new and desire to secure by Letters Patent, is:—

A wheel tire comprising in combination, a pair of outer rings, a series of inner rings of inelastic material, a series of inner rings of semi-elastic material interposed in alternating relation between said series of rings of inelastic material, and transverse fastening means passing through the parts to hold the same together, the said series of rings of inelastic material having a plurality of perforations into which portions of the series of rings of semi-elastic material are forced in an assemblage of the tire parts to lock the two series of inner rings against independent outward movement and permitting a ready separation of the parts in a replacement of an injured or worn part.

Signed at Chicago, Illinois, this 21st day of February, 1912.

JOSEPH KOHLER.

Witnesses:
ROBERT BURNS,
HENRY MOE.

Copies of this patent may be obtained for five cents each, by addressing the "Commissioner of Patents. Washington, D. C."